United States Patent
Caliendo, Jr. et al.

(10) Patent No.: US 9,513,686 B2
(45) Date of Patent: Dec. 6, 2016

(54) CONTEXT BASED POWER SAVING

(71) Applicant: Lenovo (Singapore) Pte. Ltd., Singapore (SG)

(72) Inventors: Neal Robert Caliendo, Jr., Raleigh, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 170 days.

(21) Appl. No.: 14/301,622

(22) Filed: Jun. 11, 2014

(65) Prior Publication Data
US 2015/0362976 A1 Dec. 17, 2015

(51) Int. Cl.
*G06F 1/32* (2006.01)

(52) U.S. Cl.
CPC ............ *G06F 1/3218* (2013.01); *G06F 1/3265* (2013.01)

(58) Field of Classification Search
CPC ................ G06F 1/26; G06F 1/14; G06F 3/048
USPC .......................................................... 713/320
See application file for complete search history.

(56) References Cited

U.S. PATENT DOCUMENTS

| | | | | |
|---|---|---|---|---|
| 7,383,457 | B1* | 6/2008 | Knight | G06F 1/32 713/320 |
| 2007/0094742 | A1* | 4/2007 | Morita | H04N 1/00408 726/26 |
| 2009/0172607 | A1* | 7/2009 | Dai | G09G 3/20 715/867 |
| 2012/0137217 | A1* | 5/2012 | Amsterdam | G06F 1/3228 715/256 |
| 2012/0198260 | A1* | 8/2012 | Gupta | G06F 1/3203 713/323 |
| 2013/0055001 | A1* | 2/2013 | Jeong | G06F 1/3228 713/323 |
| 2013/0339763 | A1* | 12/2013 | Lin | G06F 1/3206 713/300 |
| 2014/0043498 | A1* | 2/2014 | Lee | H04N 5/23241 348/222.1 |
| 2015/0149802 | A1* | 5/2015 | Vayrynen | G06F 1/3265 713/323 |

* cited by examiner

*Primary Examiner* — Vincent Tran
(74) *Attorney, Agent, or Firm* — Ference & Associates LLC

(57) ABSTRACT

One aspect provides a method, including: displaying, on a display device, display data; implementing, using a processor, a first power setting for the display device; accessing, using a processor, context data associated with the display data during use of the first power setting; mapping, using a processor, the context data to a predetermined display context, the predetermined display context being associated with a display setting; and switching, using the processor, the first power setting to the display setting of the display context. Other aspects are described and claimed.

18 Claims, 3 Drawing Sheets

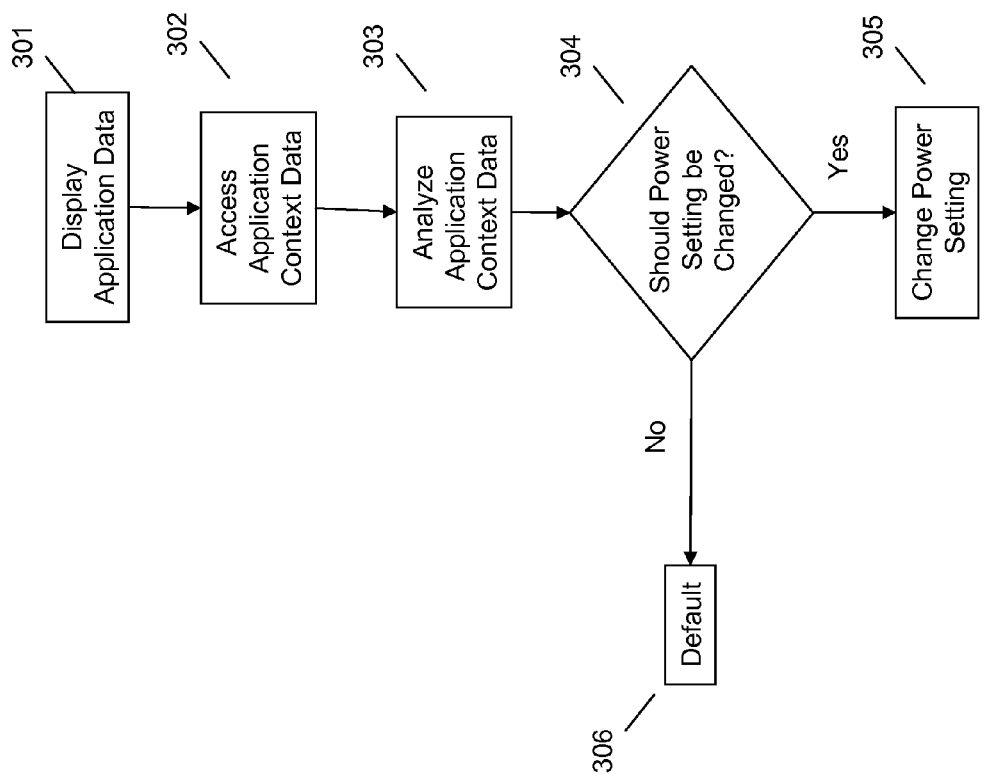

CONTEXT BASED POWER SAVING

BACKGROUND

To conserve power, many information handling devices (e.g., smart phones, tablets, laptop computers, etc.) automatically enable a low power mode for the display, sometimes known as sleep or standby mode. This includes turning off the screen and may include locking the information handling device. The low power mode is usually activated upon the conclusion of a time-out or a period of inactivity by the user.

BRIEF SUMMARY

In summary, one aspect provides a method, comprising: displaying, on a display device, display data; implementing, using a processor, a first power setting for the display device; accessing, using a processor, context data associated with the display data during use of the first power setting; mapping, using a processor, the context data to a predetermined display context, the predetermined display context being associated with a display setting; and switching, using the processor, the first power setting to the display setting of the display context.

Another aspect provides an information handling device, comprising: a display device; at least one processor operatively coupled to the display device; and a memory storing instructions that are executable by the processor to: display on the display device display data; implement a first power setting for the display device; access context data associated with the display data during use of the first power setting; map the context data to a predetermined display context, the predetermined display context being associated with a display setting; and switch the first power setting to the display setting of the display context.

A further aspect provides a product, comprising: a storage device having code stored therewith, the code being executable by a processor and comprising: code that displays, on a display device, display data; code that implements, using a processor, a first power setting for the display device; code that accesses, using a processor, context data associated with the display data during use of the first power setting; code that maps, using a processor, the context data to a predetermined display context, the predetermined display context being associated with a display setting; and code that switches, using the processor, the first power setting to the display setting of the display context.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of context based power saving.

DETAILED DESCRIPTION

Figure 1:
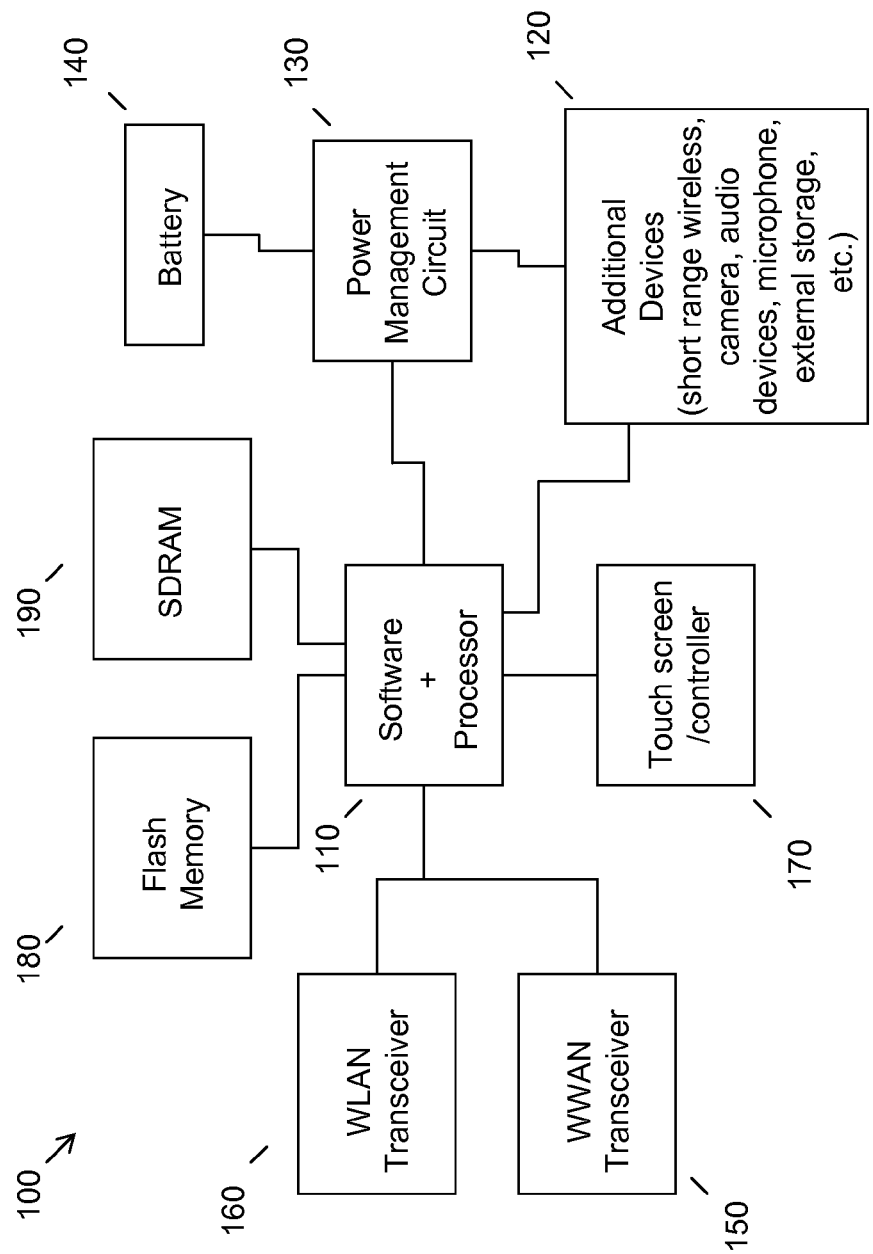
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

To conserve battery power, many information handling devices automatically engage a low power mode for the display (e.g., screen, monitor, touch screen, etc.) after a period of inactivity. This includes turning off the display and sometimes includes locking the device. The display low power mode is generally enabled when the user does not generate an input for an extended period of time (e.g., the device times-out). The information handling device does not determine whether the user is still viewing the display. Rather the information handling device calculates the time since the last user input. However, a user may be performing a task that does not require a user input, but does require the screen to remain powered.

A conventional method of disabling the low power mode of the display is forcing the screen to remain powered based on the application that is currently running (e.g., WINDOWS MEDIA player, book reader, etc.). WINDOWS MEDIA is a registered trademark of Microsoft Corporation in the United States and other countries. In other words, the application itself forces the screen to remain powered. However, using conventional methods of disabling the low power mode of the display does not encompass all situations in which a user would want the display to remain powered. For example, if the user is viewing a document on a website, the browser used to display the website may not force the display to remain powered.

Accordingly, an example embodiment provides a method of analyzing the data context and determining, based upon that analysis, the power setting of the display. An embodiment may determine that the power setting of the display includes disabling the low power setting of the display. This may allow the display to remain powered even if the user is no longer looking at the display and/or is not providing any additional user input.

By way of example, an embodiment may analyze (e.g., parse and process the text of) the data displayed. An embodiment may then determine, based upon the context of the data, the power setting of the display. For example, an embodiment may parse the data and determine that, based on the data content, the user is viewing a recipe. This type of data may generally require the user to look away from the display frequently and may not require any additional user input. However, the user may nonetheless desire that the display remain powered on. An embodiment may then disable the low power setting of the display to allow the display to remain powered on, e.g., by switching or changing the power setting for the display (which may include simply removing a low power setting).

In another example embodiment, the system may determine the power setting of the display by determining the type of application running. For example, the embodiment may determine that the user is viewing a training presentation using a company website. This type of application may require the user to listen to the presentation but may not require the user to provide any user input. Additionally, the user may not necessarily view the display for the entire time. Additionally, this type of data may not force the display to remain powered, because it is based from a website rather than a stand alone application. Therefore, the example embodiment may determine that the user is accessing a type of content (e.g., viewing a training presentation) in which the user may want the low power mode of the display to be disabled and may thereby disable the low power mode of the display.

In another example embodiment, the system may analyze the context data and determine that the user is viewing a specific type of website. For example, an embodiment may parse the website address or uniform resource locator (URL) to determine the power setting for the display. For example, an embodiment may determine that a user is viewing a news article based upon the website address or URL. An embodiment may then determine the power setting of the display is to disable the low power mode of the display.

In a further example embodiment, the system may determine the power setting of the display based upon user input. In an embodiment, a user interface may be presented to the user so that the user can select the desire power setting of the display. The user interface may be accessed by the user manually or it may automatically be displayed. For example, the user interface may be displayed upon start-up of an application or the system. An embodiment may also learn the selections of the user and determine the power setting based upon the previous selections of the user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
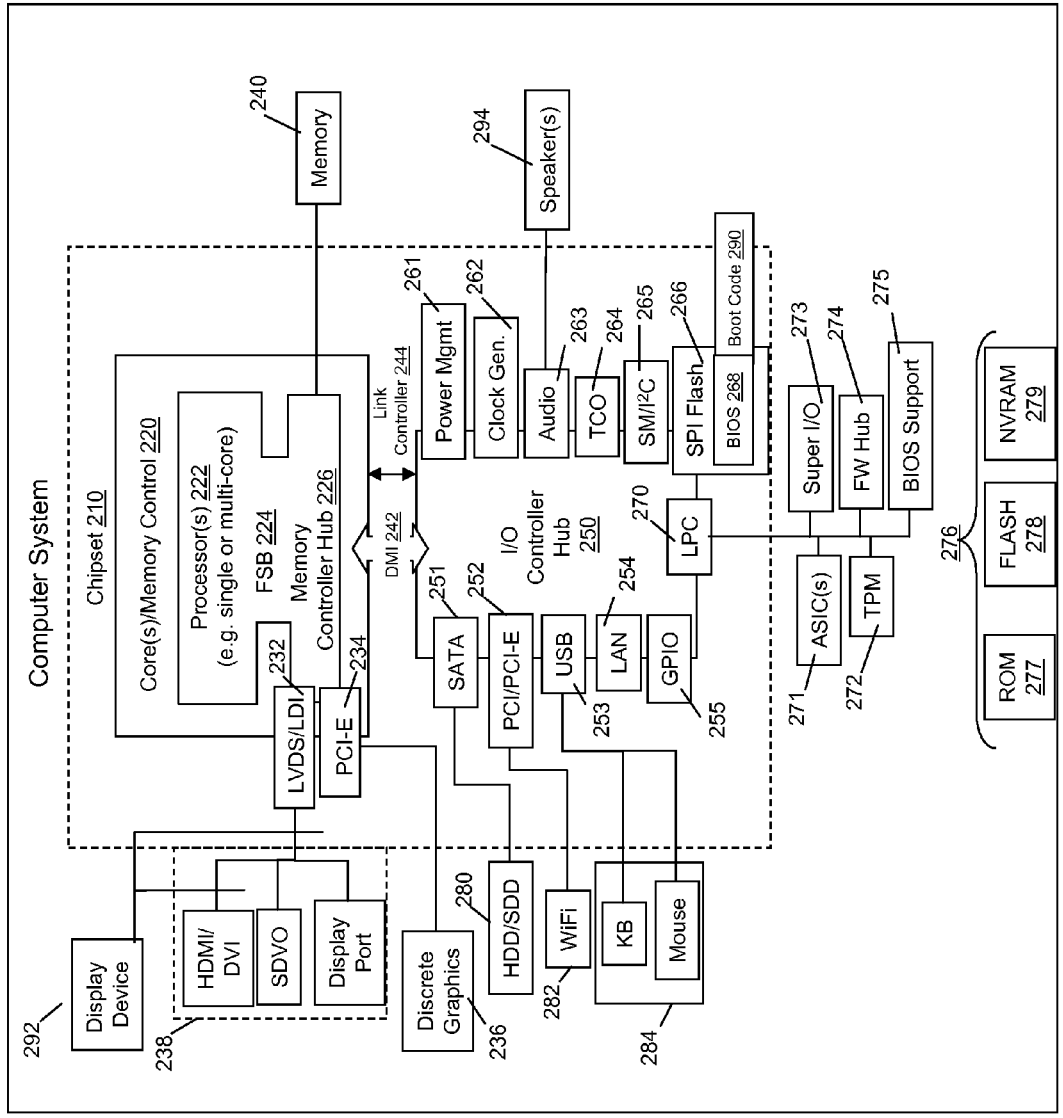
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used in information handling devices that display data. Alternatively or additionally, circuitry such as outlined in FIG. 1 and/or FIG. 2, or portions thereof, may be included in a display device itself (e.g., stand alone monitor, flat panel display, television, smart television, or the like).

Referring to FIG. 3, an embodiment may use a display (e.g., a monitor, a display screen included on a smart phone or tablet, etc.) to display data at 301. Data may include any information displayed on a display. For example, data may include a news article accessed through a website, a recipe accessed through an application, a training presentation accessed through an application, and the like. An embodiment may access, using a processor, the context data at 302 associated with the data displayed on the display. At 303, an embodiment may analyze, using a processor, the context data to determine the power setting of the display.

In one embodiment, the analysis of context data, e.g., performed at 303, may include accessing, as context data, the content of the displayed data (e.g., text of the displayed data), source information such as a URL used to access the displayed data, and/or application type data used to render the displayed data, etc.

Additionally or alternatively, an embodiment may derive context data from the user. For example, an embodiment may capture, using an image capture device (e.g., camera included on a smart phone), image data including user movement to detect whether the user is viewing the display, e.g., continuously, intermittently, etc. As another example, the system may detect the user wants the display to remain powered on because the user keeps moving the mouse in order to keep the monitor from powering off. Based upon this user input, an embodiment may detect a pattern of input or user activity that matches a context in which the user wants this particular content and/or this type of content/application to be associated with an extended viewing power setting of the display (e.g., disable the low power mode of the display). Therefore, the embodiment may learn, through user inputs, and/or a history thereof, the type of application context that should change the power setting of the display.

The context data may be analyzed, e.g., by parsing of the text, to derive a context of the displayed data that may be mapped to an appropriate power setting for the display. For example, an embodiment may parse the text of the data (e.g., a webpage, document, etc.) and determine the user is viewing a set of instructions based on a pattern matching technique, e.g., determining that the text is formatted into numbered paragraphs in the application. As another example, an embodiment may parse the text of the data and determine the user is viewing a recipe based on numbered steps and word or phrase analysis to identify a list of ingredients, particularly if the location of particular word(s) is suggestive, e.g., ingredients list located at the beginning of a document. In a further example, an embodiment may parse the text of the data and determine the user is viewing a news article based on keywords in the data matching a topic, i.e., news in this example. Thus, an embodiment may compare displayed data to preprogrammed templates in an effort to determine the type of data the user is viewing. An embodiment may have a preset list of context data types (e.g., recipes, instructions, articles, etc.) that automatically set the power setting of the display.

In another embodiment, the analysis at 303 may be completed through parsing the website address or URL. For example, an embodiment may parse the text of the website address and determine that the user is viewing a website containing news articles based upon keywords in the URL, a domain type of the URL, etc. In another example, an embodiment may parse the text of the website address and determine the user is viewing a website containing training presentations based upon keywords in the URL. An embodiment may have a preset list of websites which set the power setting of the display. An embodiment may learn website addresses in which the user prefers a specific power setting, e.g., by tracking user behavior with respect to the display setting when viewing certain materials, from certain sources, etc. An embodiment may allow a user to add a website address to a list which sets the power setting of the display whenever the user is viewing that website.

Other methods of analysis at 303 are possible. For example, an embodiment may analyze sound from a speaker or video content playing on the information handling device. Alternatively or additionally, an embodiment may analyze the type of application (e.g., WINDOWS MEDIA player, text messaging application, etc.) running on the information handling device.

After analyzing the context data at 303, an embodiment may determine at 304 whether the power setting of the display should be changed based on the context data. For example, an embodiment may determine, using the context data, that a game, video, music player, or presentation is the data the user is viewing. Based upon the analysis an embodiment may, using a processor, determine at 304 whether the user may want to change the power setting of the display even though the application requires little to no user input.

An embodiment, after parsing the website address at 303, may determine the context based upon the website address. For example, after parsing the website address, an embodiment may determine that the website is of a type that does not require user input, but in which the power setting of the display should be changed, e.g., to remain powered on for extended display. By way of example, an embodiment may determine, based upon the website address, the user is viewing an instruction set and may want the power setting of the display to be changed to avoid the low power mode in which the display is powered off after a predetermined time without user input. An embodiment may then disable the low power mode of the display.

Additionally or alternatively, an embodiment may display a user interface allowing the user to select the power setting of the display. This user interface may be displayed automatically if, for example, an embodiment cannot make a determination at 304. It may also be displayed automatically upon start-up of an application or upon system power-up. Alternatively or additionally, the user may open the user interface manually to make a selection. If the user selects to change the power setting of the display (for example, the user selects to disable the low power mode of the display), an embodiment may store that selection to later make a determination at 304. An embodiment may thus learn these selections by the user and use this information to make a determination about future display contexts, e.g., based upon the similarity of the context data. At 305, an embodiment may change the power setting of the display. Alternatively, if the embodiment determines at 304 the power setting of the display should not be changed, then the embodiment may maintain the default power setting at 306.

Therefore, an embodiment may analyze the context data and determine that the user is viewing an application in which the user will provide little to no input, but is an application in which a user would prefer that the power setting of the display be modified (e.g., the user desires that the low power mode of the display to be disabled). Thus, an embodiment provides a user the ability to view an application with the low power mode of the display disabled. Additionally, the user will not have to continually provide user input to prevent the low power mode of the display from engaging.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   displaying, on a display device, display data;
   implementing, using a processor, a first power setting for the display device;
   accessing, using a processor, context data associated with the display data during use of the first power setting;
   mapping, using a processor, the context data to a predetermined display context, the predetermined display context being associated with a display setting; and
   switching, using the processor, the first power setting to the display setting of the display context, wherein the switching comprises modifying the power setting of the display device for the display data.

2. The method of claim 1, wherein the mapping comprises parsing text of the display data.

3. The method of claim 1, wherein the mapping comprises parsing a resource address associated with the display data, and matching the resource address with a predetermined display context.

4. The method of claim 1, wherein the context data is derived at least in part from a user history.

5. The method of claim 1, wherein the context data is derived at least in part from the user.

6. The method of claim 5, wherein the context data is derived from user input to a component temporarily affecting the display during use of the first power setting.

7. The method of claim 6, wherein the first power setting comprises a power savings mode.

8. The method of claim 5, wherein the context data comprises data derived from user image data captured via a camera operatively coupled to the display device.

9. The method of claim 8, wherein the context data comprises data derived from repeatedly captured user image data.

10. An information handling device, comprising:
a display device;
at least one processor operatively coupled to the display device; and
a memory storing instructions that are executable by the processor to:
display on the display device display data;
implement a first power setting for the display device;
access context data associated with the display data during use of the first power setting;
map the context data to a predetermined display context, the predetermined display context being associated with a display setting; and
switch the first power setting to the display setting of the display context, wherein to switch comprises modifying the power setting of the display device for the display data.

11. The information handling device of claim 10, wherein to map comprises parsing text of the display data.

12. The information handling device of claim 10, wherein to map comprises parsing a resource address associated with the display data, and matching the resource address with a predetermined display context.

13. The information handling device of claim 10, wherein the context data is derived at least in part from a user history.

14. The information handling device of claim 10, wherein the context data is derived at least in part from the user.

15. The information handling device of claim 14, wherein the context data is derived from user input to a component temporarily affecting the display during use of the first power setting.

16. The information handling device of claim 15, wherein the first power setting comprises a power savings mode.

17. The information handling device of claim 14, wherein the context data comprises data derived from user image data captured via a camera operatively coupled to the display device.

18. A product, comprising:
a storage device having code stored therewith, the code being executable by a processor and comprising:
code that displays, on a display device, display data;
code that implements, using a processor, a first power setting for the display device;
code that accesses, using a processor, context data associated with the display data during use of the first power setting;
code that maps, using a processor, the context data to a predetermined display context, the predetermined display context being associated with a display setting; and
code that switches, using the processor, the first power setting to the display setting of the display context, wherein the code that switches comprises code that modifies the power setting of the display device for the display data.

* * * * *